G. E. ELIA.
APPARATUS FOR DETECTING AND INDICATING THE PRESENCE OF SUBMARINE BOATS.
APPLICATION FILED DEC. 13, 1918.
1,310,563.
Patented July 22, 1919.
4 SHEETS—SHEET 3.
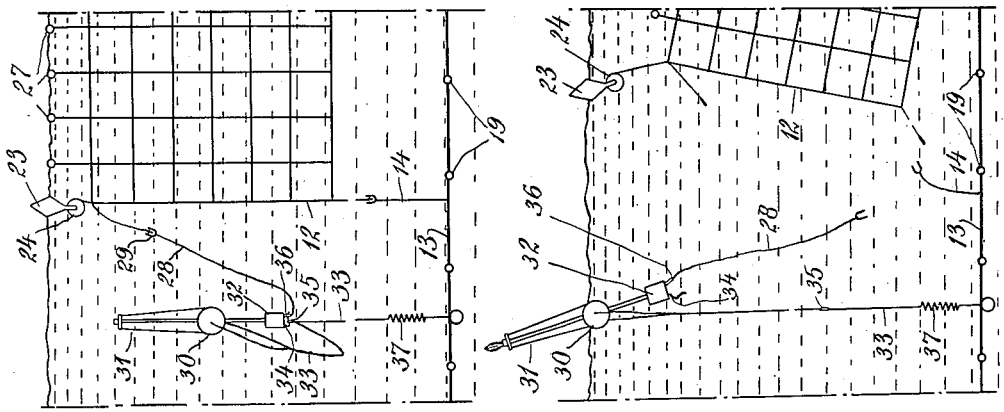
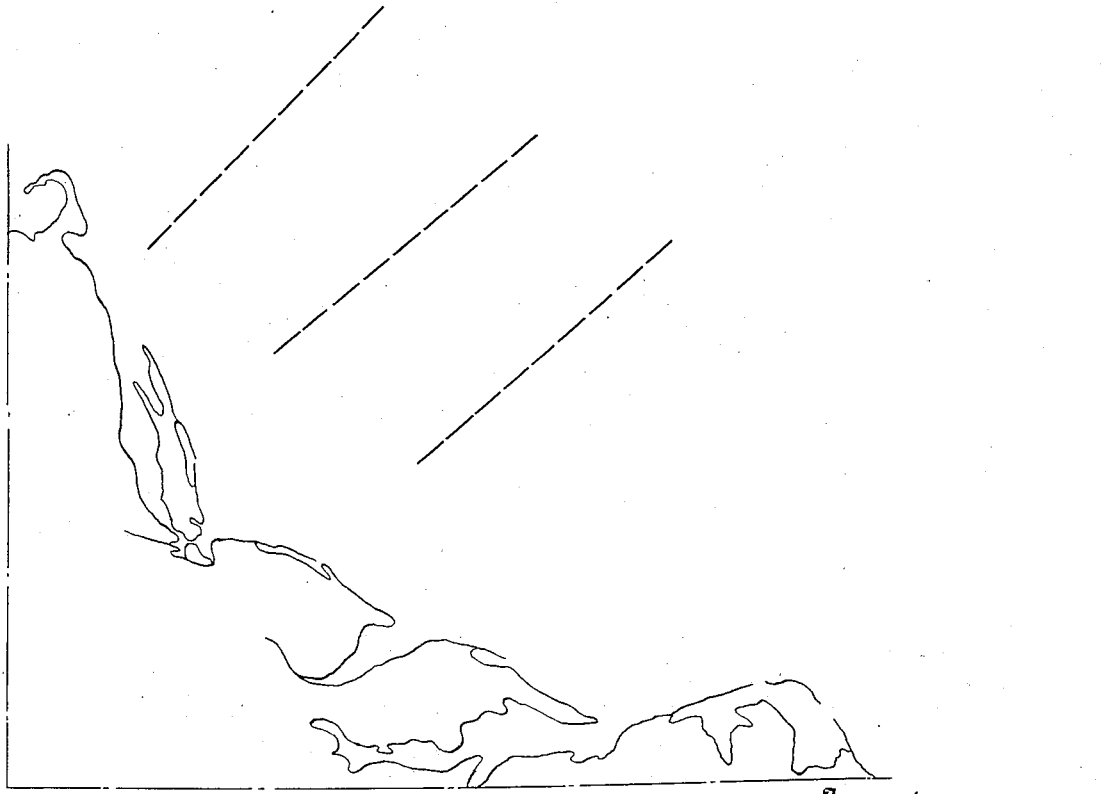

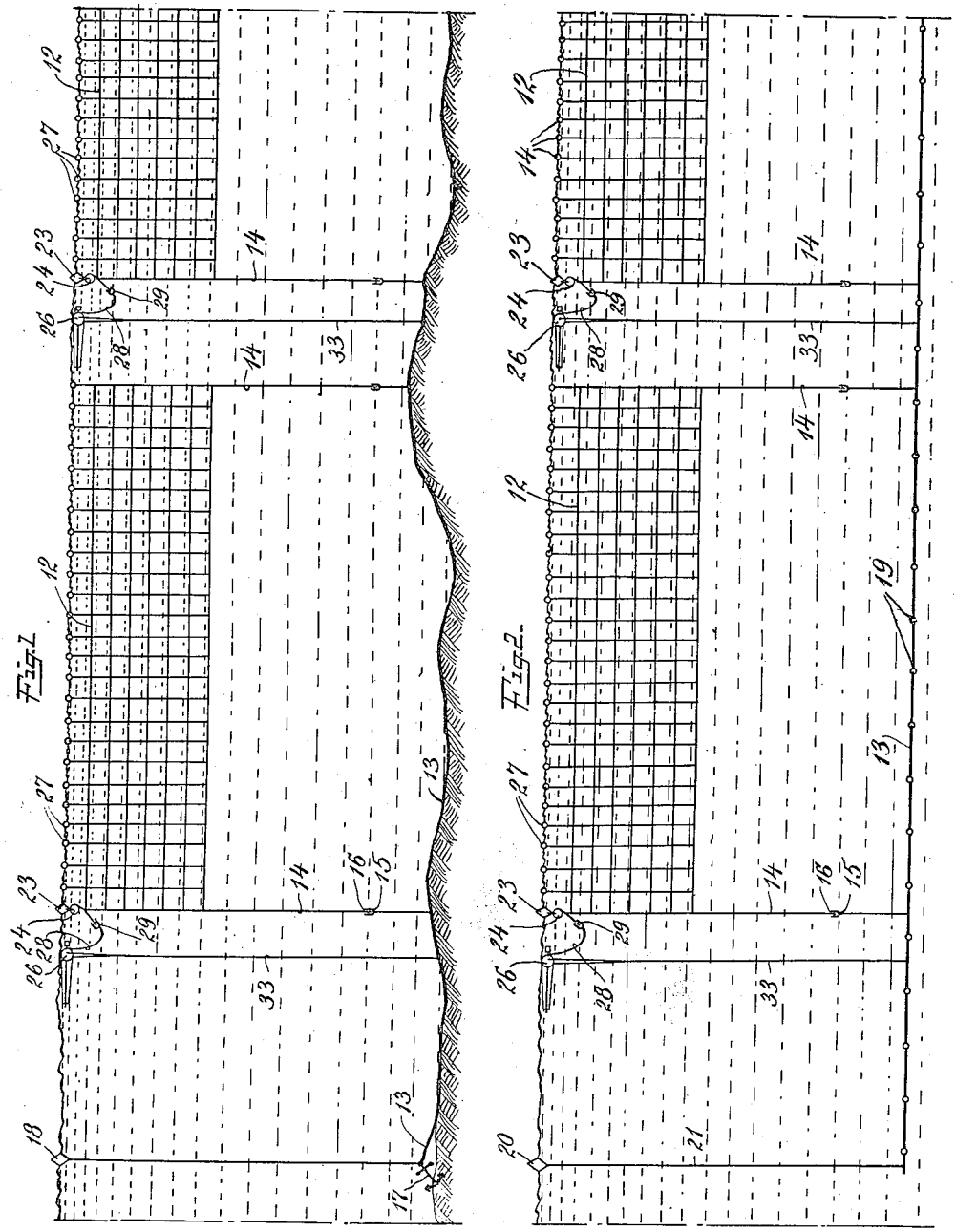

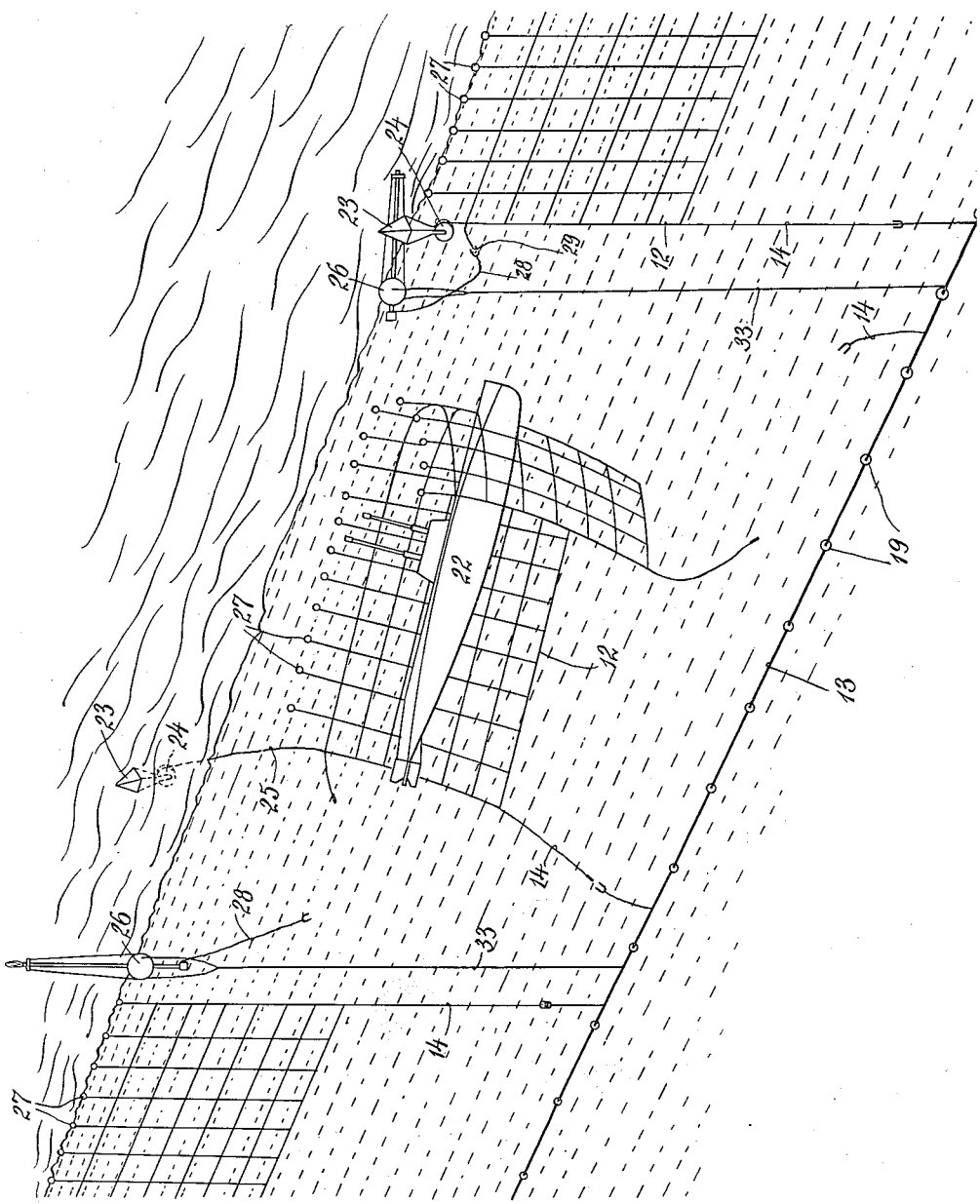

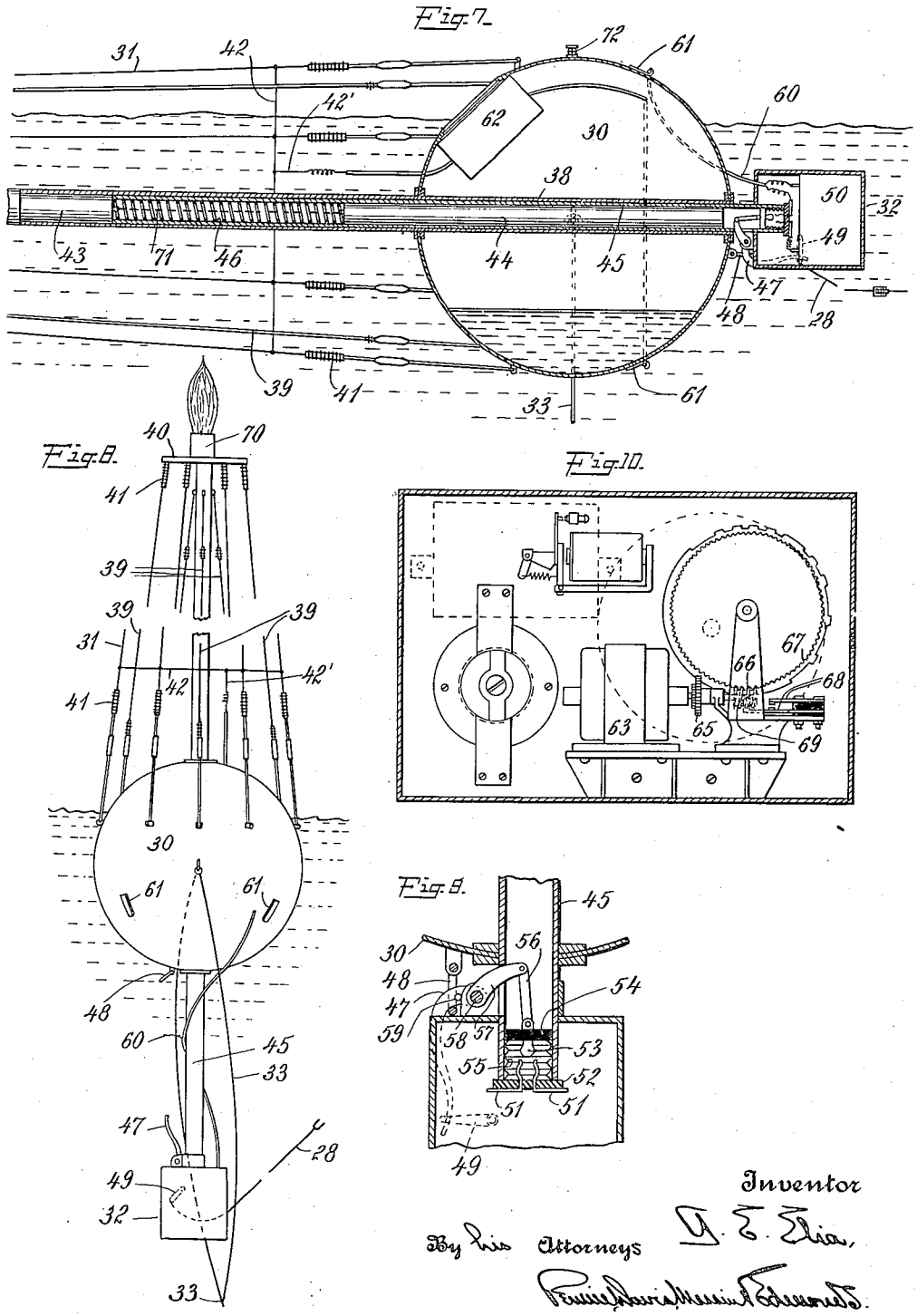

UNITED STATES PATENT OFFICE.

GIOVANNI EMANUELE ELIA, OF ROME, ITALY.

APPARATUS FOR DETECTING AND INDICATING THE PRESENCE OF SUBMARINE BOATS.

1,310,563. Specification of Letters Patent. Patented July 22, 1919.

Original application filed April 27, 1917, Serial No. 164,850. Divided and this application filed December 13, 1918. Serial No. 266,561.

*To all whom it may concern:*

Be it known that I, GIOVANNI EMANUELE ELIA, a subject of the King of Italy, residing at Rome, Italy, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention relates to apparatus for detecting and indicating the presence of submarine boats and involves the use of nets adapted to be placed in the sea as barriers to be engaged by hostile submarine boats and signaling devices arranged to be operated under predetermined conditions to convey information that a submarine boat has engaged a net and to indicate approximately the location of the net which has been so engaged.

The invention involves the use of a barrier consisting of a plurality of net sections and a plurality of automatic signaling devices associated with the nets so that when any net is carried away by a submarine boat the signaling devices corresponding to that net will be actuated and will send out a distinctive signal indicating its location, preferably the nets of the barrier are held in position by a submerged series cable which may lie on the bottom or if the depth of the water is too great may be suspended at a predetermined distance below the surface of the water; the several net sections are connected individually to this series cable so that the cable will serve to hold the net sections in proper relative positions and the individual connections of the nets to the cable permit any net section to be carried away without displacing the other nets of the barrier.

The automatic signaling device may be of any suitable character as for instance one which on the occurrence of predetermined conditions emits a signal flame. However, the form of signaling device which I prefer to employ is an automatic wireless telegraph transmitter. The signaling device is normally inoperative and also is normally in a position unsuited for operation. When a wireless telegraph transmitter is employed as the signaling device, it is necessary or at least highly desirable that while the transmitter is in operation it shall project a substantial distance above the surface of the sea. This condition, however, would be undesirable when the apparatus is not in operation as it would indicate the existence of the signaling apparatus. To prevent this, the signaling device may lie normally in an inoperative position in which it projects but a small amount above the surface of the sea and it may be caused to assume an upright position automatically when it is to send its signal. Or, the signaling device may be normally submerged a substantial distance below the surface of the water and when it is to operate it may be released from its holding means and allowed to rise by its own buoyancy to the surface.

The present invention relates to this latter form in which the signaling device is buoyant and is normally held submerged, its release from its holding means being effected by the net when the latter is carried away, as this application constitutes a division of the application for patent filed by me on April 27, 1917, and serially numbered 164,850 in which broader aspects of the invention are claimed.

The invention will be better understood by reference to the following description taken in connection with the accompanying drawings. In these drawings, Figure 1 is a view of one end of the net barrier with the series cable resting on the bottom; Fig. 2 is a view similar to Fig. 1 showing the series cable submerged but sustained by the various floats; Fig. 3 is a view similar to Fig. 2 showing one of the nets engaged by a submarine boat; Fig. 4 is a diagrammatic view showing one way in which such net barriers may be employed; Fig. 5 is a view corresponding to Fig. 2 but showing a different form of signaling device; Fig. 6 is a view similar to Fig. 5 illustrating the action which takes place when the net is carried away; Fig. 7 is a sectional view of a form of signaling device differing in some respects from that shown in Fig. 5; Fig. 8 is a view of the signaling device shown in Fig. 7 in the upright operative position; and Figs. 9 and 10 are views of portions of the wireless transmitting apparatus.

Referring first to Figs. 1 and 2, the net barrier consists of a plurality of nets 12 disconnected from each other and each connected individually to a series cable 13; each net 12 may be of substantial length, as for instance, 1000 feet, and it is preferably made from steel cable or from links connected together at their ends. The several nets of the series are not directly connected; there may be a space of approximately 30 feet between the adjacent ends of adjacent nets. Each net is provided with a plurality of buoys 27 connected to its upper edge and serving to sustain the net in a substantially vertical position. From various points along the lower edge of each net, connection is made to the cable 13. Such connections are shown at 14 at each end of each net. If desired, additional connections may be placed intermediate the ends of the nets. Each of these connections 14 is weakened at one or more points along its length as by providing a shearing pin of soft metal extending through eyes in the ends of a yoke 15 and a member 16 connected to two sections of the connection 14. Fig. 1 shows the cable 13 on bottom and this arrangement would be employed when the water is not of too great depth. When the cable so rests on bottom, its ends are sustained in position by means of anchors 17 and each anchor is marked by a buoy 18 connected to the anchor to facilitate raising the anchor when it is desired to remove or change the location of the net barrier. When the water is of such depth as to make it undesirable to place the cable on bottom, the cable is suspended at a suitable depth, as is indicated in Fig. 2. When this is to be done, the cable 13 is preferably provided with a multiplicity of buoyant elements 19 which sustain a substantial portion of the weight of the cable. In addition to these buoyant elements the cable is sustained by the connections 14 to the bottom edges of the nets and also by buoys 20 connected to the cable, as shown at 21. Furthermore, it may be desirable to have the extreme ends of the cable 13 carried up to patrol boats which would serve to hold the cable 13 more or less taut, preventing excessive and undesirable shifting of the position of the barrier.

Fig. 3 shows a plurality of the nets connected individually to the series cable 13 and a submarine boat 22 engaging one of the nets and carrying it along with the boat. As will be noted from this figure, the movement of the net along with the boat results in breakage of the individual connections 14 to the series cable 13 at the shearing pins provided for that purpose. The net is therefore freed from the other nets of the barrier and these other nets continue to be maintained in their positions by the cable 13.

Each net 12 is provided with one or more buoys 23 so connected to the net that they will remain upon the surface of the water even though the boat 22 descends to a relatively great depth and carries the net with it. For this purpose, each buoy 23 is preferably provided with a spring-actuated reel 24 and a cable 25 is connected to the reel and the net and is normally wound upon the reel. As the net descends with the boat 22, the reel 24 unwinds to pay out the cable 25 so that the buoy 23 remains on the surface to serve as an indication of the position of the boat 22.

For the purpose of transmitting information that a submarine boat has entered a net and indicating the position of the boat, the net barrier is provided with a plurality of signaling devices, one for each net. Such signaling devices are shown at 26 in Figs. 1, 2 and 3. Each of these signaling devices is connected to the series cable 13 by a cable 33. Also, each of these signaling devices is connected to its net 12, as is shown at 28. Preferably each of these connections 28 has a shearing pin therein, as indicated at 29. The signaling devices 26 are normally inoperative and the connections 28 thereto serve as the means for rendering any signaling device operative when its net 12 is drawn through the water by a submarine boat. However, after a signaling device has been started in operation, it is preferable to have it disconnected from the net and to remain attached to the cable 13 and the shearing pins 29 are provided in the connections 28 for this purpose. When the movement of the net through the water with a boat which has engaged it commences, the connection 28 is drawn taut and subjected to a strain sufficient to cause operation of the signaling device 26, and thereafter when the strain on the connection 28 becomes greater, the shearing pin 29 is broken so as to disconnect the signaling device from the net. In Fig. 3 the connection 28 to the signaling device 26 corresponding to the net 12 which has been engaged by the boat 22 is shown as broken at the shearing pin, whereas the connection 28 of the other signaling device 26 whose net remains in place is shown as intact.

Each of the signaling devices is normally in an inoperative position in which it does not project substantially above the surface of the water. The arrangement which constitutes the subject matter of this application is that illustrated in Figs. 5 and 6 wherein the signaling device is held normally in a wholly submerged position as shown in Fig. 5 and the movement of the net is arranged to release the holding means for the signaling device to permit the latter to rise to the surface by its own buoyancy as is indicated in Fig. 6.

The signaling devices shown in the drawings are adapted for the transmission of signals by wireless telegraphy. Each signaling device consists of a buoyant casing 30, an aerial 31 mounted thereon, and a box 32 for a battery connected to the casing 30. The signaling device is connected by a cable 33 to the series cable 13. In Fig. 5 the signaling device is shown as held in a submerged position by having an intermediate portion of the cable 33 detachably connected to the signaling device. For this purpose a latch 34 is pivotally mounted upon the bottom of the battery box 32 and passes through a ring 35 secured to the cable 33. A second ring 36 is pivotally mounted upon the bottom of the box 32 and receives the end of the latch 34. The connection 28 from the signaling device to the net 12 is connected to this ring 36. Thus, when the connection 28 is drawn taut by movement of the net 12, the ring 36 is withdrawn from the end of the latch 34 and the buoyant signaling device rises to the surface, the latch 34 swinging on its pivot so as to release the ring 35 therefrom. Fig. 6 shows the signaling device after it has been so released and has risen to the surface of the water, and it will be seen that the aerial 31 is projected upwardly from the surface of the water to permit of transmitting signals therefrom. If desired, when conditions permit, one or more springs 37 may be inserted in the cable 33 to check the rate of the upward movement of the signaling device toward the end of that movement.

Figs. 7 and 8 show a signaling device of the general type illustrated in Figs. 5 and 6 but differing therefrom in that the inoperative position of the signaling device is one in which it floats upon the surface of the water but in a horizontal position so that it is but partially submerged and floats in a position in which no part of the mechanism projects a substantial distance above the surface of the water. The structure shown in Figs. 7 and 8 is like that shown in Figs. 5 and 6 in that it includes a buoyant casing 30 preferably spherical, an aerial 31 mounted on the buoyant casing, a battery box 32 and a cable 33 connected to the opposite sides of the casing 30 and leading to the series cable 13. The casing 30 has a tubular mast 38 mounted thereon; this mast preferably extends entirely through the casing 30 and is rigidly secured to opposite sides thereof. Suitable stays or guy wires 39 are connected to the tubular mast 38 near its upper end and also to the casing 30 so as to assist in holding the mast rigidly. The wires of the aerial 31 extend from the casing 30 up to a ring 40 mounted on the mast near the upper end thereof and insulators 41 are inserted in the wires of the aerial in accordance with the usual wireless telegraphy practice. Near their lower ends the several vertical wires 31 of the aerial are connected together, as shown at 42, and a connection 42' leads from this common wire 42 into the casing 30.

Within the tubular mast 38 is a stationary stop 43 and also a movable cylindrical member 44 which is preferably made of heavy metal. This member 44 is secured within a tube 45 adapted to slide axially within the hollow tubular mast 38. A coiled spring 46 is arranged within one end of the tube 45 and its ends coact with the stop 43 and the end of the cylindrical member 44. At its opposite end the tube 45 is secured to the battery box 32. Normally these parts of the signaling device occupy the positions in which they are shown in Fig. 7 and the spring 46 is under considerable tension, constantly exerting pressure upon the end of the member 44 to move the tube 45 in the hollow mast 38 in the direction to carry the battery box 32 away from the casing 30. Such movement of the battery box and tube 45 is prevented by a pivoted latch 47 mounted on the battery box and corresponding to the latch 34 shown in Fig. 5. This latch 47 passes through a ring 48 pivotally mounted on the casing 30 and coacts with the ring to hold the battery box and casing 30 in the relative positions shown. Turning movement of the latch 47 on its pivot is prevented by a pivoted ring 49 which receives the end of the latch and the cable 28 leading to the net is connected to this ring 49. Thus, when the cable 28 is drawn taut, it turns the ring 49 about its pivot far enough to carry it off of the end of the latch 47 and the pressure of spring 46 forces tube 45 out of the hollow mast 38 carrying the battery box 32 away from the casing 30 a considerable distance. As the battery box moves, the latch 47 is turned on its pivot and is withdrawn from the ring 48. This new arrangement of the parts is illustrated in Fig. 8. Any suitable means may be provided for arresting the outward movement of the battery box from the casing, such, for instance, as the chain 71 shown in Fig. 7 connected at one end to the plug 43 and at the other end to the cylindrical member 44.

One of the advantages of a construction such as that described in which the movement of the signaling device from the inoperative to the operative position is effected by a shift of the center of gravity thereof, is that the device may be made much lighter. In order to permit of adjusting the weight of the signaling device at the time of launching it so as to insure that it will float as desired, the casing 30 may be provided with an opening and a cap for the opening as shown at 72 in Fig. 7, whereby prior to launching the signaling device, as much water may be let into the casing 30 as may be required to give the signaling apparatus the desired weight. In Fig. 7, the signaling device is shown as having a supply of water therein to give it additional weight.

Within the box 32 is the battery 50 for furnishing the electric energy employed in transmitting wireless telegraph signals.

This battery is of considerable weight and it is for that reason that it is placed in the box 32 separate from the casing 30 and arranged for movement away from the casing 30. When the box 32 is moved from the Fig. 7 to the Fig. 8 position, the center of gravity of the signaling apparatus as a whole is materially changed with the result that the device is caused to turn from the horizontal position shown in Fig. 7 to a substantially vertical position, such as that indicated in Fig. 8, wherein the aerial is shown as projecting upwardly from the surface of the water in condition for transmitting wireless telegraph signals.

In addition to causing movement of the signal transmitter from the inoperative to the operative position, it is necessary that the pull of the net should result in starting the transmitting apparatus in operation. This may be most conveniently done by causing the movement of certain parts effected by the pull of the cable to close an electric circuit of the wireless transmitter. In Figs. 7 and 9 the circuit of the battery 50 is shown as including a pair of contacts 51 mounted on an insulating plate 52 and adapted to be cross-connected by a plug 53 which may be moved into and out of position between the two spring contacts 51. The plug 53 is shown as mounted upon the cover 54 of a bellows 55 and an extension of the plug above the cover 54 is pivotally connected to a link 56 whose opposite end is connected to a crank 57 mounted loosely on the shaft 58 to which the latch 47 is rigidly secured. On the latch 47 or the shaft 58 is an abutment 59 which, when the latch is turned to release spring 46, is carried into engagement with the crank 57 and operates the latter to move the plug 53 in between the spring contacts 51 where it is held by the curvature of the contacts and forms the electrical connection between them.

The wires completing the circuit of the battery 50 form a flexible cable 60 which passes through the top of the box 32 and through the casing 30 by water-tight connections. Between these connections the cable 60 is of ample length to permit of the movement of the box 32 from the Fig. 7 to the Fig. 8 position. Prior to launching the signaling apparatus, this portion of the cable 60 is preferably coiled upon the casing 30, as is indicated in Fig. 7, the convolutions being held releasably in position by means of soft metal clamps 61 such that when the battery box 32 is pushed out by spring 46 and the cable 60 is subjected to a slight strain, these clamps 61 will unfold so as to release the convolutions of the cable 60 held thereby. Within the casing 30 the wires of the cable 60 pass into the box 62 for the wireless transmitting apparatus.

The specific construction employed in this apparatus forms no part of the present invention and therefore it is not illustrated in detail. However, certain of the parts of the preferred form of wireless apparatus are illustrated in Fig. 10. From this figure it will be noted that there is an electric motor 63 supplied with current from the battery 50 and arranged to drive a signal transmitting wheel 64. The shaft of the motor 63 is connected by gearing 65 to a countershaft which carries a worm 66 meshing with a worm wheel 67 mounted for rotation in suitable bearings. The shaft of the worm wheel 67 carries the signal transmitting wheel 64. A pair of insulated contacts 68 are mounted as shown in the drawing and one of these contacts is extended and carries a roller 69 which bears on the periphery of the circuit controlling wheel 64. When one of the portions of wheel 64 of the smaller radius comes into coaction with the roller 69, the spring action of the lower contact 68 causes the roller to enter the depression in the circuit controlling wheel and this movement closes the electrical connection between the two contacts 68. It will be understood that each signal transmitter has its transmitting wheel 64 shaped for the transmission of a distinctive signal. The details of the apparatus whereby the closing and opening of the circuit through the contacts 68 is made to send out wireless impulses will be understood by those skilled in the art and need not be described in further detail.

In addition to sending out wireless telegraph signals, the apparatus may be arranged for displaying a visual signal. The means employed for this apparatus should be such that the visual signal is displayed for an extended period of time. For instance, the visual signal may be given by means of rockets fired automatically one after another at suitable time intervals following the shift of the signal transmitting apparatus from the normal inoperative position to the operative position. Or the visual signal may be given by a torch which is ignited automatically when the transmitting apparatus is shifted to the operative position. In Fig. 8, such a torch is shown at 70 mounted upon the upper end of the mast 38 of the wireless transmitter.

It will be noted that by means of the construction described herein, the net barrier may be arranged in the sea in position to furnish protection for a harbor, channel or the like or a path which surface vessels would be apt to follow, that this barrier consists of a plurality of nets which are not directly connected together in any way but which are connected individually to a series cable by which all of the nets are held together to constitute a barrier and that if a submarine boat engages one of these nets it may carry that net away without affecting any of the other nets. Each net is provided with its individual signaling device arranged to lie normally in an inoperative position and it at once assumes an operative position and commences operation when the net corresponding thereto is engaged and propelled through the water by a submarine boat. The operation of the signaling device may be arranged to send signals of any one of several different kinds or signals of two or more kinds, as for instance, the wireless and visual signals referred to in connection with Fig. 8. Such signals sent out by the transmitting apparatus would be received at a receiving station on shore or on a patrol boat and the officer in charge of the receiving station would at once be advised of the location of the net which had been carried away and hence the approximate location of the hostile boat which had engaged that net. The patrol boat would proceed at once to the location indicated and on arrival there would make search for the buoys marking the position of the net itself. This position would be shown by the several buoys 14 and 23 if the boat were near the surface and by the one or more buoys 23 only if the boat had submerged to a depth sufficient to carry the net below the surface. If the net were of considerable length, as for instance, 1000 feet, as is preferred, it would be improbable that all of the buoys 14 throughout the length of the net would be carried under water. After locating and proceeding to the buoys marking the location of the net engaged by the submarine boat, the men in charge of the patrol boat would undertake the task of destroying the boat, using for this purpose depth mines which are exploded automatically when they have descended to a predetermined depth.

Ordinarily this system of protection against submarine attack would be employed in the protection of harbors, channels and the like as by placing one or more of the net barriers of say five or ten miles in length across the entrance to a harbor or channel. But such a barrier may also be employed in the open ocean by placing one or more of the barriers across a path which is apt to be used by hostile submarine boats or by placing one or more of the barriers on either side of a lane which is to be traversed by surface vessels for which protection against submarine attack is desired. Such a use of the barriers in the open ocean is indicated in Fig. 4, wherein three of the barriers are shown as positioned substantially parallel one to another in the Atlantic Ocean off the coast of the United States. When so used, the construction illustrated in Fig. 2 would be employed including a series cable which is sustained at a selected depth below the surface of the water by buoys and preferably the ends of this series cable would be carried up to patrol boats which would keep the cable taut and thus prevent disarrangement of the nets of the barrier. A patrol boat stationed behind such a barrier in readiness to pick up signals sent out by any one of the signal transmitting devices would constitute a bait which would lure a hostile submarine boat to a course which would lead it into the net. In the case of parallel barriers of the type indicated in Fig. 4, if after an extended period of time the barriers drifted away from the desired location, the foremost one of the three barriers could be taken in tow by the boats to which its series cable was attached and towed through the water back to the rear of the series of barriers so as to reestablish the condition which originally existed.

I claim:

1. Apparatus for detecting and indicating the presence of submarine boats comprising the combination of a net adapted to be submerged in the sea, a buoyant signaling device, means for holding the signaling device submerged, a connection from the net to the signaling device and means operated by movement of the net through the water for releasing the buoyant signaling device from its holding means to permit it to rise to the surface and for causing operation of the signaling device to send its signal.

2. Apparatus for detecting and indicating the presence of submarine boats comprising the combination of a net adapted to be submerged in the sea, a buoyant signaling device, means for holding the signaling device submerged, a connection from the net to the signaling device, means operated by movement of the net through the water for releasing the buoyant signaling device from its holding means to permit it to rise to the surface and for causing operation of the signaling device to send its signal, and means for effecting disconnection of the net from the signaling device after it has served to cause operation of the signaling device.

3. Apparatus for detecting and indicating the presence of submarine boats comprising the combination of a barrier consisting of a plurality of nets adapted to be submerged in the sea, a plurality of buoyant signaling devices each connected to a net, means for holding the several signaling devices submerged, and means operated by movement of any net through the water for effecting the release of the corresponding signaling device from its holding means to permit the signaling device to rise to the surface of the water under its own buoyancy and for causing the signaling device to operate to send its signal.

4. Apparatus for detecting and indicating the presence of submarine boats comprising the combination of a submerged cable, a plurality of nets connected individually to the submerged cable, a plurality of buoyant signaling devices, connections from the signaling devices to the submerged cable for holding the signaling devices beneath the surface of the water and means operated by movement of any net through the water for effecting the release of the holding means of the corresponding signaling device to allow that signaling device to rise to the surface under its own buoyancy and for causing the signaling device to operate to send its signal.

5. Apparatus for detecting and indicating the presence of submarine boats comprising the combination of a submerged cable, a plurality of nets connected individually to the submerged cable, a plurality of buoyant signaling devices, connections from the signaling devices to the submerged cable for holding the signaling devices beneath the surface of the water, means operated by movement of any net through the water for effecting the release of the holding means of the corresponding signaling device to allow that signaling device to rise to the surface under its own buoyancy and for causing the signaling device to operate to send its signal, and means for effecting disconnection of a net which has been carried away from its signaling device after it has caused operation of the signaling device.

6. Apparatus for detecting and indicating the presence of submarine boats comprising the combination of a net adapted to be submerged in the sea, a buoyant automatic signaling device, a latch on the signaling device, an anchoring means connected to the latch for holding the buoyant signaling device submerged and a connection from the net to the latch through which movement of the net through the water causes operation of the latch to release the anchoring means of the buoyant signaling device and allow that device to rise to the surface of the water and also causes the automatic signaling device to operate to send its signal.

7. Apparatus for detecting and indicating the presence of submarine boats comprising the combination of a net adapted to be submerged in the sea, a buoyant automatic signaling device, a latch on the signaling device, an anchoring means connected to the latch for holding the buoyant signaling device submerged, a connection from the net to the latch through which movement of the net through the water causes operation of the latch to release the anchoring means of the buoyant signaling device and allow that device to rise to the surface of the water and also causes the automatic signaling device to operate to send its signal, and means for effecting disconnection of the net from the signaling device after the latch has been operated.

8. Apparatus for detecting and indicating the presence of a submarine boat comprising the combination of a net adapted to be submerged in the sea, a buoyant automatic signaling device, a pivoted hook on the signaling device, an anchor for holding the signaling device submerged connected to the hook, a pivoted latch coacting with the hook to form a closed connection between the anchor and the signaling device, and a cable extending from the net to the closed connection whereby when the net is carried away by a submarine boat the latch is disengaged from the hook to release the signaling device from its anchor and allow the signaling device to rise under its own buoyancy and send its signal.

9. Apparatus for detecting and indicating the presence of a submarine boat comprising the combination of a net adapted to be submerged in the sea, a buoyant automatic signaling device, a pivoted hook on the signaling device, an anchor for holding the signaling device submerged connected to the hook, a pivoted latch coacting with the hook to form a closed connection between the anchor and the signaling device, a cable extending from the net to the closed connection whereby when the net is carried away by a submarine boat the latch is disengaged from the hook to release the signaling device from its anchor and allow the signaling device to rise under its own buoyancy and send its signal and means for effecting disconnection of the net from the signaling device after the connection of the signaling device to its anchor has been released to permit the signaling device to rise.

10. Apparatus for detecting and indicating the presence of a submarine boat comprising the combination of a net, a buoyant automatic signaling device, a pivoted hook on the signaling device, a latch for the hook forming with the hook a closed connection, a ring through which the closed connection extends, anchoring means for holding the signaling device submerged connected to said ring and a cable connection from the net to the closed connection whereby movement of the net through the water opens the closed connection to release the ring therefrom thereby effecting the release of the signaling device from its anchoring means and allowing the signaling device to rise to the surface of the water and operate to send its signal.

In testimony whereof I affix my signature.

GIOVANNI EMANUELE ELIA.